3,598,837
OLEFIN COMPLEXES OF MOLYBDENUM AND TUNGSTEN

Fausto Calderazzo and Rene Henzi, Geneva, Switzerland, assignors to American Cyanamid Company, Stamford, Conn.
No Drawing. Filed Sept. 5, 1967, Ser. No. 665,248
Int. Cl. C07d 27/18
U.S. Cl. 260—326.3                9 Claims

ABSTRACT OF THE DISCLOSURE

Halgen pentacarbonyl anions of Group VI transition metals, molybdenum and tungsten, of the formula $$[MX(CO)_5]^- (M=Mo \text{ and } W, X=Cl, Br, I)$$

are reacted with active double-bond compounds, such as maleic anhydride and maleimide, and conjugated double-bond compounds, such as p-benzoquinone. The compounds are new. Also, hexacarbonyls of the same transition metals react with p-benzoquinone to give neutral complexes in which there are three quinone ligands per metal. These complexes, which are also new chemical compounds, may exist either as monomers or polymers.

BACKGROUND OF THE INVENTION

Halogen pentacarbonyl anions of the transition metals of Group VI, molybdenum and tungsten, have been reacted with a number of compounds, such as amines, isonitriles, and the like, to form complexes with a smaller number of carbonyl groups, and certain monoolefin complexes with the metal in a zero oxidation state have been reported.

SUMMARY OF THE INVENTION

This invention relates to novel complexes of transition metals represented by the formula:

$$[Z]^+ [MX(CO)_2 (\text{olefin})_3]^-$$

and $$[Z]^+ [MX(\text{quinone})_3]^-$$

wherein

[Z]+ is a cation
M is a transition metal selected from the group consisting of molybdenum and tungsten;
olefin is a compound selected from the group consisting of olefins containing an active double bond; and
X is selected from the group consisting of chlorine, bromine, and iodine.

These compounds are prepared by contacting a salt of the formula:

$$[Z]^+ [MX(CO)_5]^-$$

with either an olefin or quinone wherein [Z]+, M, X, and olefin are as defined above. Heat is required when an olefin is a reactant but not when quinone is a reactant.

This invention also relates to a compound of the formula:

$$Mo(C_6H_4O_2)_3$$

and to a process of preparing same by contacting molybdenum hexacarbonyl with p-benzoquinone.

Reactions of the halogen pentacarbonyl anions of molybdenum and tungsten with the olefins, maleic anhydride or maleimide, or with an aromatic dicarbonyl compound, such as p-benzoquinone are included in the present invention. This is a new and satisfactory process for both types of compounds as very high yields are obtained. The complexes obtained are new chemical compounds.

Also included are neutral reaction products of p-benzoquinone with hexacarbonyls of the same metals. These compounds may exist in the form of monomers or polymers.

In the case of reactions with maleic anhydride and maleimide, there are produced compounds in which three of the carbonyl groups of [MX(CO)$_5$]$^-$ are replaced by maleic anhydride or maleimide. The formula of the resulting products is therefore [MX(CO)$_2$(Olefin)$_3$]$^-$ In the case of the p-benzoquinone, which has twice as many reactive double bonds, all of the carbonyls are replaced, to give anionic complexes of formula (MX quinone)$_3^-$. It should be noted that in the case of the salts, but not of the neutral compounds, of the quinone complexes, the halogen is still present, and this would seem to require that the molybdenum and tungsten are seven coordinate in these compounds, the seventh coordination position being occupied by the halogen. Such complexes with other materials are not unknown, and while it cannot be proven that in these compounds the materials are seven coordinate, it seems to be a reasonable explanation. However, it is also possible to visualize a polymeric structure for the metal halide triquinone anionic complexes in which one quinone ligand acts as a bridge between two different metal atoms. Therefore, it is not intended to limit the invention to particular theories of exact coordinate structure. The number of ligands in the compounds is definitely known.

The quinone molybdenum complexes are, in general, easily attacked by water, the solids for the most part being deep blue or black. The corresponding quinone tungsten compounds are black-violet solids which are not soluble and which can be used as pigments. The molybdenum complexes are for the most part useful as reactants, for example for the production of metal mirrors by vapor deposition and the like.

The specification, in formula throughout before the M stands for either molybdenum or tungsten, and X for a halogen, (chlorine, bromine or iodine). The cations, in the modification in which a salt of the metal halogen pentacarbonyl is used, are unimportant. A very convenient cation is tetraethylammonium, but other cations, such as lithium, may be used. In the case of the maleic anhydride and maleimide complexes, when the cation is triphenanthroline nickel, the compounds are insoluble in water and this can be used to precipitate the complex anions [MX(CO)$_2$(Olefin)$_3$]$^-$ from aqueous solution.

The various ligands are not of equal reactivity. For example, maleic anhydride is considerably less reactive, and a side reaction takes place slowly so that with the longer reaction times needed there may be some decomposition. However, when rapidly precipitated from solution as the triphenanthroline nickel salts, they can be produced substantially uncontaminated with complexed maleic acid. No problem is presented with maleimide, which reacts much more rapidly, and similarly, the p-benzoquinone reacts rapidly and produces high yields. It seems probable that the different rate of reactivity may be due to the different strength of $\pi$-acceptance. This correlates well with the results obtained and is advanced as a reasonable explanation, although it has not been rigidly proven to be the only factor involved and so, of course, the invention is not limited to this particular theory of reaction When the cation is lithium and 2,2'-dimethoxydiethyl-ether, usually referred to as diglyme, is the reaction medium, the products obtained contain two moles of solvent of crystallization.

Because of the sensitivity of the quinone complexes to water, they are preferably prepared in very dry, organic liquids, such as anhydrous tetrahydrofuran, diglyme, and the like.

DESCRIPTION OF THE PREFERRED EMBODIMENTS

The invention will be described more particularly in conjunction with the following examples, in which the parts are by weight unless otherwise specified.

Example 1

Compounds with maleimide of the following formula $$[MoCl(CO)_2(maleimide)_3]^-$$

were produced by reacting 36 mmoles of maleimide and 7.5 mmoles of $$NEt_4[MoCl(CO)_5]$$

in boiling tetrahydrofuran. The reaction was complete in about 2 hours, and a deep red precipitate resulted which was filtered, washed with tetrahydrofuran, and dried, and had the formula $$[NEt_4][MoCl(CO)_2(maleimide)_3]$$

The yield was 81%. This product is insoluble in non-polar organic solvents and is slightly soluble in acetone and dimethylsulfoxide. It is stable in dry air but is somewhat sensitive to light.

Example 2

The procedure of Example 1 was repeated, replacing the tetraethylammonium compound by $LiMoCl(CO)_5$ and using diglyme instead of tetrahydrofuran. The lithium salt was obtained in high yield but showed some diglyme of crystallization, about two moles. It was an orange solid and, as first precipitated, contained some lithium chloride as well as the diglyme of crystallization. The complex was checked by infrared analysis and nuclear magnetic resonance spectra.

Example 3

The procedure of Example 1 was repeated, using the tetraethylammonium molybdenum bromopentacarbonyl. A high yield was obtained of a compound having the formula $$[NEt_4][MoBr(CO)_2(maleimide)_3]$$

Example 4

The procedure of Example 1 was repeated, using the corresponding tetraethylammoniumtungstenchloropentacarbonyl. A high yield was obtained of a product having the formula $$[NEt_4][WCl(CO)_2(maleimide)_3]$$

Example 5

The process of Example 4 was repeated, using the corresponding tungstenbromopentacarbonyl. A good yield of a compound was obtained having the formula $$[NEt_4][WBr(CO)_2(maleimide)_3]$$

The products of all of the examples had the same deep red color.

Example 6

The procedure of Example 3 was repeated, replacing the maleimide with a corresponding amount of maleic anhydride. The product obtained had the formula $$[NEt_4][MoBr(CO)_2(maleic\ anhydride)_3]$$

but was not pure because of contamination with tetraethylammoniumbromide resulting from the competing reaction:

$$NEt_4[MoBr(CO)_5] + CO \rightarrow Mo(CO)_6 + NEt_4Br$$

Example 7

The procedure of Example 4 was repeated, replacing the maleimide with maleic anhydride. A good yield of a product having the formula $$[NEt_4][WCl(CO)_2(maleic\ anhydride)_3]$$

was obtained, the ratio of CO to tungsten for the product being 1.95 (theoretical 2).

Example 8

The procedure of Example 5 was repeated, replacing the maleimide with maleic anhydride. A good yield was obtained of a product having the formula $$[NEt_4][(WBr(CO)_2(maleic\ anhydride)_3]$$

This product was slightly contaminated, the ratio of CO to tungsten being 1.75.

Example 9

An aqueous solution of the product of Example 5 was precipitated with an aqueous solution of $(Ni\ phen)_3^{2+}$ in which phen stands for phenanthroline the precipitation being quantitative. No complex of maleic acid was formed. The compounds, which were more stable than those of Example 5, were orange-yellow in color instead of deep red.

Example 10

The procedure of Example 9 was followed, but a solution of the product obtained from Example 6 was used instead of the product from Example 5. A good yield was obtained of a product having the formula $$[Ni(phen)_3^+][WCl(CO)_2(maleic\ anhydride)_3]_2$$

The solid had the same orange-yellow color as the product of Example 9.

Example 11

4.98 mmoles of a compound having the formula $$[NEt_4][MoCl(CO)_5]$$

was dissolved in 75 ml. of tetrahydrofuran, and 16.6 mmoles of p-benzoquinone was stirred in at room temperature. Gas evolution (CO) started immediately. After 15 hours a blue-black precipitate came down, which was filtered, washed with tetrahydrofuran and heptane, and dried in vacuo. It represented a 96% yield of a compound having the formula $$[NEt_4][MoCl(C_6H_4O_2)_3]$$

The compound was a black powder, practically insoluble in common organic solvents and in liquid $SO_2$. It was highly resistant to dry air or oxygen, but could not be sublimed as it decomposed at 180°–200° C. even in a high vacuum.

Example 12

The procedure of Example 11 was repeated, substituting the tetraethylammonium salt of molybdenum brompentacarbonyl for the chlorine compound. An 87% yield was obtained of a black product having the formula $$[NEt_4][MoBr(C_6H_4O_2)_3]$$

Example 13

3.02 mmoles of the salt $$Li[MoCl(CO)_5] \cdot 2\ diglyme$$

was dissolved in 100 ml. of diglyme and 2.31 mmoles of p-benzoquinone stirred in at room temperature. Carbon monoxide was evolved, and after 2 hours the reaction was practically complete. A black precipitate was obtained, filtered, and washed with diglyme and heptane. An 82% yield was obtained of the product having the formula $$Li[MoCl(C_6H_4O_2)_3] \cdot 2\ diglyme$$

Example 14

4.74 mmoles of the salt having the formula $$Li[MoBr(CO)_5] \cdot 2\ diglyme$$

was treated with 4.62 mmoles of p-benzoquinone and 50 ml. of diglyme at 29° C. The reaction was carried out under an atmosphere of carbon monoxide, and after 4 hours a yield of 96.2% was obtained of a black solid having the formula $$Li[MoBr(C_6H_4O_2)_3] \cdot 2 \text{ diglyme}$$

The lithium salts of Examples 13 and 14 are black powders, slightly soluble in dry acetone and dimethylsulfoxide, and insoluble in most other organic solvents. They are sensitive to moisture, and when dissolved in water a deep blue solution is obtained. This was obviously not a solution of the complexes but the result of the attack of the complex by water.

EXAMPLE 15

The procedure of Example 13 was repeated using the lithium salt of the corresponding tungsten chloropentacarbonyl. A 93% yield was obtained of a compound having the formula $$Li[WCl(C_6H_4O_2)_3] \cdot 2 \text{ diglyme}$$

EXAMPLE 16

The procedure of Example 14 was repeated, replacing the lithium salt of molybdenum bromopentacarbonyl with the corresponding tungsten compound. An 85% yield was obtained of a compound having the formula $$Li[WBr(C_6H_4O_2)_3] \cdot 2 \text{ diglyme}$$

EXAMPLE 17

The procedure of Example 11 was repeated, using the corresponding tungsten chloropentacarbonyl. A 94% yield of a black solid was obtained having the formula $$[NEt_4][WCl(C_6H_4O_2)_3]$$

EXAMPLE 18

The procedure of Example 12 was repeated, substituting the corresponding tungsten bromopentacarbonyl for the molybdenum compound. An 89% yield of a black solid was obtained having the formula $$[NEt_4][WBr(C_6H_4O_2)_3]$$

EXAMPLE 19

The procedure of Example 18 was repeated, substituting the tungsten iodopentacarbonyl for the bromopentacarbonyl. A 95% yield of a deep brown solid was obtained, having the formula $$[NEt_4][WI(C_6H_4O_2)_3]$$

EXAMPLE 20

2.65 mmoles of molybdenum hexacarbonyl was heated with 11.01 mmoles of p-benzoquinone in 60 ml. of reflexing toluene. CO gas evolution started, and after 3 hours had ceased. The solid formed during the reaction was filtered, washed with toluene and petroleum ether, and dried in vacuo. The yield was 95.2% and the compound had the formula $$Mo(C_6H_4O_2)_3$$

The product was a blue-black powder insoluble in common organic solvents, stable to dry oxygen, but deliquescing in moist air.

We claim:

1. A process of producing a complex salt of a transition metal, said salt having a cation selected from the group consisting of lithium and tetraethylammonium and having an anion of the formula:

$$[MX(CO)_2(\text{olefin})_3]^-$$

wherein
M is molybdenum,
olefine is a member selected from the group consisting of maleimide and maleic anhydride, and
X is a halide selected from the group consisting of chlorine, bromine, and iodine,
which process comprises heating and reacting a salt having the cation defined above and an anion of the formula:

$$[MX(CO_5)]^-$$

wherein M and X are as defined above, with a member selected from maleimide and maleic anhydride.

2. A process according to craim 1 in which the metal is molybdenum and the olefin is maleimide.
3. A process according to claim 1 in which the metal is tungsten and the olefin is maleimide.
4. A process according to claim 1 in which the metal is molybdenum and the olefin is maleic anhydride.
5. A process according to claim 1 in which the metal is tungsten and the olefin is maleic anhydride.
6. A process according to claim 1 in which the cation of the salt is lithium.
7. A process according to claim 1 in which the cation of the salt is tetraethylammonium.
8. The process of claim 1 wherein said olefin is selected from the group consisting of maleimide and maleic anhydride.
9. A salt of a complex anion having the formula $$[MoX(CO)_2(\text{Olefin})_3]^-$$

in which X is selected from the group consisting of chlorine and bromine, olefin is a member selected from the group consisting of maleimide and maleic anhydride and the cation is selected from the group consisting of lithium and tetraethylammonium.

References Cited

UNITED STATES PATENTS 3,296,288   1/1967   Keblys et al. _____ 260—429

ALEX MAZEL, Primary Examiner

J. A. NARCAVAGE, Assistant Examiner

U.S. Cl. X.R.

106—1; 117—107.2; 260—346.8, 429

UNITED STATES PATENT OFFICE
CERTIFICATE OF CORRECTION

Patent No. 3,598,837            Dated August 10, 1971

Inventor(s) FAUSTO CALDERAZZO AND RENE HENZI

It is certified that error appears in the above-identified patent and that said Letters Patent are hereby corrected as shown below:

Column 1, line 13, cancel "Halgen" and substitute -- Halogen --.

Column 2, line 8, add a "period" before the word In.

Column 2, line 36, cancel the entire line 36 and substitute

-- In formulas throughout the specification, the M -- .

Column 2, line 38, delete the "comma" after the word halogen.

Column 6, line 13, cancel "olefine" and substitute -- olefin --.

Signed and sealed this 15th day of February 1972.

(SEAL)
Attest:

EDWARD M. FLETCHER, JR.          ROBERT GOTTSCHALK
Attesting Officer                  Commissioner of Patents